United States Patent [19]
Teramachi et al.

[11] Patent Number: 5,653,547
[45] Date of Patent: Aug. 5, 1997

[54] SPHERICAL JOINT WITH AN ELASTIC CAP

[75] Inventors: Hiroshi Teramachi; Takeki Shirai; Shigeru Murata, all of Tokyo, Japan

[73] Assignee: THK Co., Ltd., Tokyo, Japan

[21] Appl. No.: 534,971

[22] Filed: Sep. 28, 1995

[30] Foreign Application Priority Data

Sep. 30, 1994 [JP] Japan .................... 6-236236
Apr. 4, 1995 [JP] Japan .................... 7-079172

[51] Int. Cl.$^6$ .................... F16C 11/06
[52] U.S. Cl. .................... 403/132; 403/135; 403/138; 403/145
[58] Field of Search .................... 403/132, 133, 403/135, 138, 144, 145, 146

[56] References Cited

U.S. PATENT DOCUMENTS

| | | | |
|---|---|---|---|
| 357,337 | 2/1887 | Rosenblatt | 403/133 X |
| 1,740,971 | 12/1929 | Corlett | 403/122 |
| 2,453,742 | 11/1948 | Bowen et al. | 403/132 X |
| 3,833,309 | 9/1974 | Hobbs | 403/122 |
| 3,967,907 | 7/1976 | Schmidt | 403/133 |
| 4,203,683 | 5/1980 | Rogers | 403/132 |
| 4,478,531 | 10/1984 | Levinson et al. | 403/122 X |
| 4,482,266 | 11/1984 | Kaneko | 403/122 X |
| 4,979,844 | 12/1990 | Teramachi | 403/134 |
| 5,070,906 | 12/1991 | Teramachi | 29/898.049 |

FOREIGN PATENT DOCUMENTS

| | | | |
|---|---|---|---|
| 220843 | 5/1987 | European Pat. Off. | 403/132 |
| 53-12655 | 5/1978 | Japan . | |
| 62-288716 | 12/1987 | Japan . | |
| 63-214517 | 9/1988 | Japan | 403/135 |
| 64-12118 | 1/1989 | Japan . | |
| 7-310741 | 11/1995 | Japan . | |

Primary Examiner—Kenneth J. Dorner
Assistant Examiner—Andrea Chop
Attorney, Agent, or Firm—Armstrong, Westerman, Hattori, McLeland & Naughton

[57] ABSTRACT

The present invention relates to a spherical joint for transmitting rotating and rocking motions between an inner member and an outer member in sliding contact with each other, and provides a spherical joint which is excellent in the mechanical strength and capable of achieving smooth rocking or rotating motions, and a process for manufacturing the spherical joint. In order to achieve this object, according to the present invention, there is provided a spherical joint comprising: an internal member having a convex-spherical surface; an outer member cast by using the inner member as a core and so connected to the inner member as to rock and rotate relative to the inner member; and a bushing sandwiched between the inner member and the outer member and having a concave-spherical surface for sliding contact with the convex-spherical surface of the inner member. When the outer member is to be cast, the bushing made of a thin metal is partially fused to and rigidly unified with the cast outer member.

4 Claims, 11 Drawing Sheets

SPHERICAL JOINT WITH AN ELASTIC CAP

FIELD OF THE INVENTION AND RELATED ART STATEMENT

The present invention relates to a spherical joint and a process for manufacturing the same. More particularly, the present invention relates to a spherical joint, which can establish smooth rotating and rocking motions and find its suitable application to a transmission or a steering unit of an automobile or a link motion mechanism of other various automatic machines, and a process for manufacturing the same.

Figure 18:
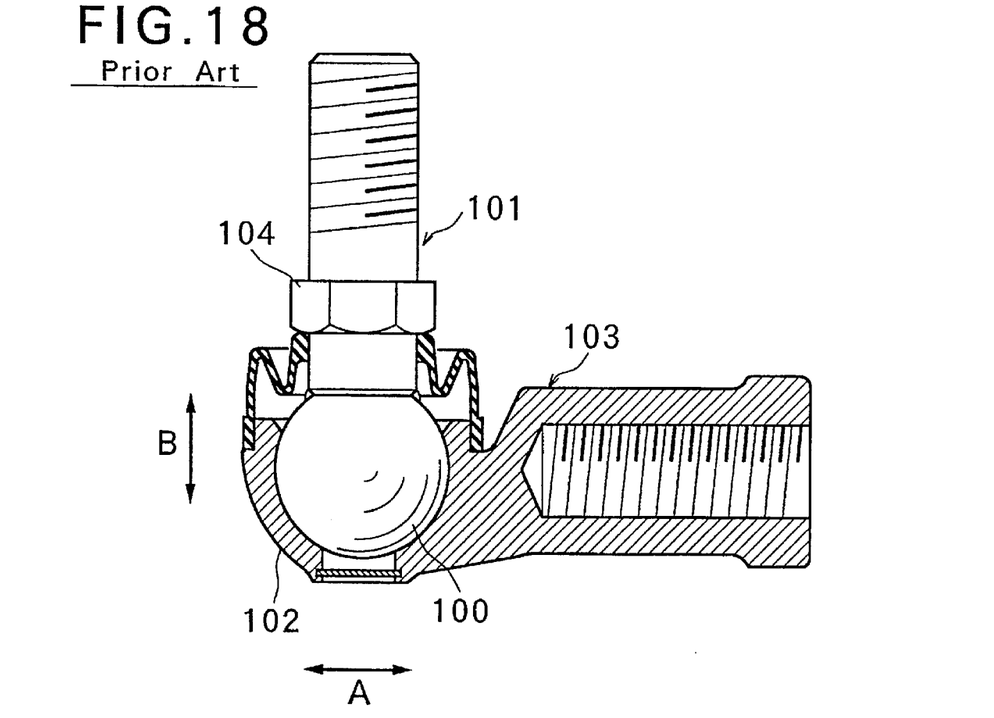
FIG. 18 is a section showing one example of the spherical joint of the prior art.
Figure 19:
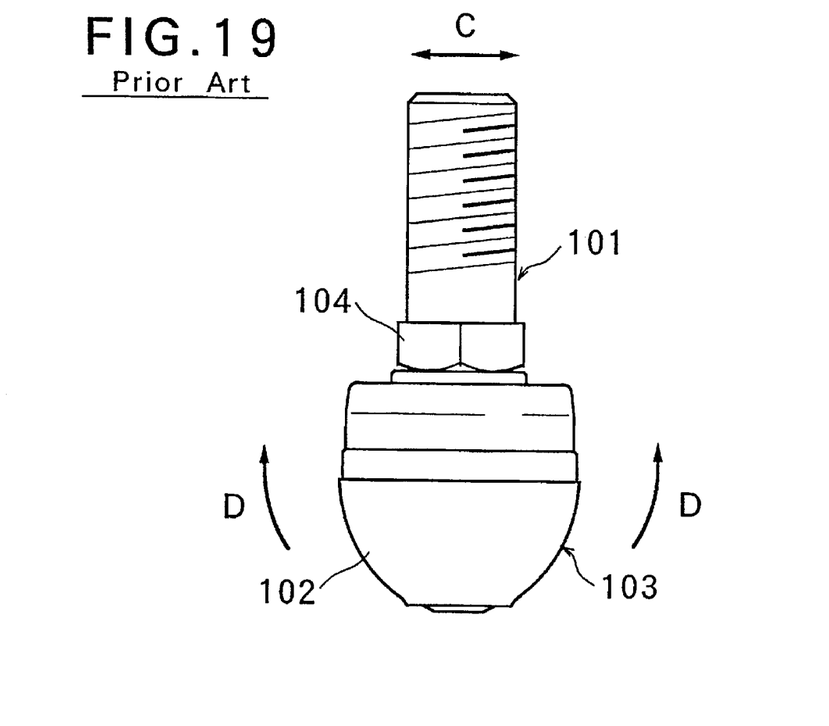
FIG. 19 is a lefthand side elevation of the spherical joint shown in FIG. 18.

In the prior art, the spherical joint of this kind is constructed, as shown in FIGS. 18 and 19, to include an inner member 101 having a ball portion 100 at its one end, and an outer member 103 having a ball retaining portion 102 for retaining the ball portion 100 and engaging generally in the shape of letter "L" with the inner member 101. In this known spherical joint, the inner member 101 and the outer member 103 are so connected to each other as to rock or rotate (as disclosed in Japanese Patent Publication No. 77886/1993).

In order to realize the smooth rocking or rotating motions of the inner member 101, the spherical joint, as disclosed, is manufactured as follows. First of all, the outer member 108 having the ball portion 100 retained in the ball-retaining portion 102 is cast by exemplifying a core by the ball to form the ball portion 100 of the inner member 101. Next, a threaded portion 104 is welded to the ball which is exposed from the ball-retaining portion 102, to form the inner member 101. After this, an external force is finally applied to the ball-retaining portion 102 of the outer member 108 to form a clearance between the ball portion 100 of the inner member 101 and the ball-retaining portion 102 of the outer member 103. According to this manufacture method, the ball, such as a bearing steel ball having a high sphericity is used as the core at the casting time. As a result, the spherical surface of the ball is transferred at the casting time to the ball-retaining portion 102 of the outer member 108 so that the clearance between the ball portion 100 of the inner member 101 and the ball-retaining portion 102 of the outer member 103 can be minimized. This makes it possible to achieve the light and smooth rocking or rotating motions of the inner member 101.

In this spherical joint, on the other hand, the inner member and the outer member are in direct sliding contact. Hence, the material for making the outer member has to be excellent, not only in the mechanical strength, but also in the characteristics as the bearing. However, the material capable of satisfying these two characteristics is limited to raise a problem that mass production for lowering the cost is difficult.

Therefore, there have been proposed spherical joints in which a bearing material is sandwiched between the outer member and the inner member.

In one proposed spherical joint, as disclosed in Japanese Patent Laid-Open No. 12118/1989, there is sandwiched between an inner ring or the inner member and the outer member a bearing sheet of a resin, in which is buried a metallic mesh member to function as the bearing for the convex-spherical surface of the inner ring.

This spherical joint is manufactured by a process substantially identical to that of the spherical joint of Japanese Patent Publication No. 66886/1993, but the bearing sheet is covered in advance with the inner ring when the outer member is to be cast by using the inner ring as the core. As a result, when the outer member is cast by pouring the molten metal into the mold, the inner circumference of the outer member partially bites into the mesh member of the bearing sheet so that the bearing sheet and the outer member can be rigidly unified.

In this spherical joint, however, the bearing sheet is exemplified by one made of a resin. As a result, the bearing sheet will melt at its portion contacting with the molten metal, when the outer member is to be cast, to raise a problem that a gall is formed between the exposed metallic mesh member and the inner ring.

When the outer member is to be cast, moreover, the end portion of the bearing sheet and the sprue cutting portion of the casting mold have to come into contact so that the molten metal poured into the mold may be prevented from flowing out toward the inner member. The sprue cutting portion of the mold is difficult to come into rigid contact with the bearing sheet of a resin. As a result, the molten metal may flow out of the gap between the bearing sheet and the sprue-cutting portion toward the inner ring thereby to fix the inner ring and the outer member. Moreover, the end portion of the bearing sheet may contact and melt with the molten metal to establish a clearance between the bearing sheet and the sprue cutting portion.

Another spherical joint is known, as disclosed in Japanese Patent Publication No. 12655/1978. In this spherical joint, a bearing metal layer having a lower melting point is cast on the surface of a ball, and an outer member having a higher melting point is then cast by using the ball as the core. Thus, when the outer member is cast, the bearing metal layer is contacted and melted by the molten metal so that the bearing metal layer and the outer member are rigidly unified after cooling down. If an external force is applied in this state to the aforementioned ball, a fine clearance is established between the bearing metal layer and the ball to allow smooth rocking or rotating motions of the rod which is welded to the ball.

According to this manufacture process, however, the end portion of the cast bearing metal layer is liable to have burrs, which will form a clearance between the end portion of the bearing metal layer and the sprue cutting portion of the mold. As a result, the molten metal may flow out of the clearance between the bearing metal layer and the sprue cutting portion toward the inner ring thereby to fix the inner ring and the outer member.

According to this manufacture process, moreover, a small difference in the melting point prevails between the bearing metal layer and the outer member. If the molten metal contacts the bearing metal layer when the outer member is cast, the bearing metal layer is partially melted again. As a result, the metallic materials of the bearing metal layer and the outer member partially mix with each other so that the bearing metal layer loses its initial metallic characteristics. Thus, there arise problems that the bearing metal layer has its durability lowered against the load and that a seizure between the ball and the bearing metal layer is liable to occur due to the frictional heat.

Figure 20:
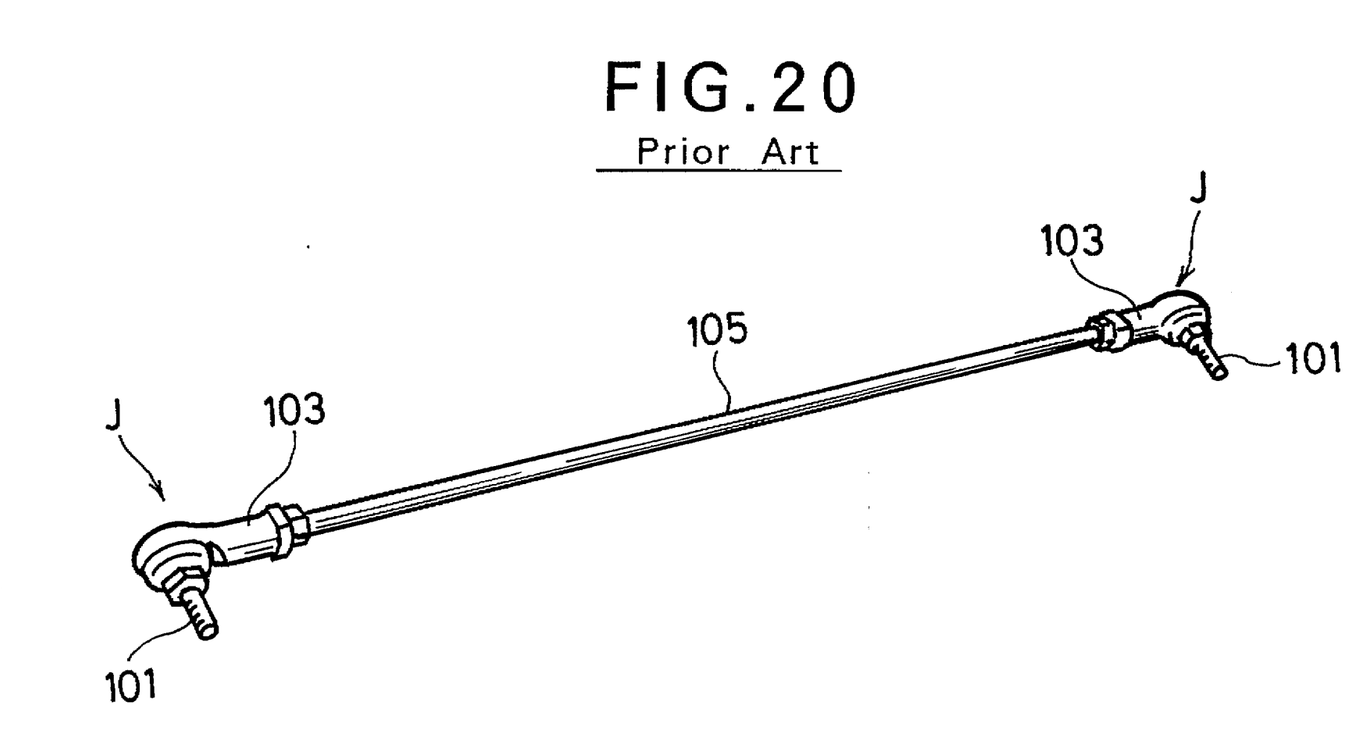
FIG. 20 is a perspective view showing an example of the link mechanism which is constructed by using the spherical joint shown in FIG. 18.

Incidentally, the spherical joint thus constructed is used by a link mechanism, as shown in FIG. 20, which is constructed by connecting the outer members 103 and 103 of a pair of spherical joints J through a connecting rod 105 and by fixing the individual inner members 101 and 101 on the different moving parts (not shown) to transmit the load from one moving part to the other. As a result, in each spherical joint, the load acts mainly in a direction perpendicular to the inner member 101.

Because of the clearance of the spherical joint between the ball portion of the inner member and the ball-retaining portion of the outer member, however, backlashes, as indicated by arrows A, B and C in FIGS. 18 and 19, are caused between the inner member and the outer member if the link mechanism is vibrated as a whole under the condition of no load transmission.

With these backlashes, the ball portion and the ball-retaining portion repeat their collisions to enlarge the clearance between the ball portion 100 and the ball-retaining portion 102 thereby to make it difficult to accurately transmit the motion of one moving portion to the other. As a result of this enlarged clearance, moreover, a vicious cycle arises whereby the backlashes between the inner member and the outer member are drastically increased. Because of these backlashes, moreover, the spherical surface of the ball portion 100 or the ball retaining portion 102 is deformed to raise a problem that the rocking and rotating motions lose their smoothness over time.

If, on the other hand, an impact load or an abrupt acceleration acts upon the line mechanism in its entirety under the condition of no load transmission, the outer member may fall in the direction, as indicated by arrow D in FIG. 19, relative to the inner member. This results in a problem that a collision noise is generated at each fall between the edge portion of the ball-retaining portion 102 of the outer member 103 and the inner member 101.

OBJECTS AND SUMMARY OF THE INVENTION

The present invention has been conceived in view of those problems and has an object to provide both a spherical joint, which can achieve smooth rotating and rocking motions of the inner member relative to the outer member and which is excellent in durability, and a process for manufacturing the spherical joint.

Another object of the present invention is to provide a spherical joint which can prevent any backlash between the inner member and the outer member under the condition of no load and can transmit the load accurately between the inner member and the outer member even after a long period of use and which can avoid any deterioration of the smoothness of the rocking and rotating motions.

Specifically, according to the present invention, there is provided a spherical joint comprising: an inner member having a convex-spherical surface; an outer member cast by using the inner member as a core and so-connected to the inner member as to rock and rotate relative to the inner member; and a bushing sandwiched between the inner member and the outer member and having a concave-spherical surface for sliding contact with the convex-spherical surface of the inner member. When the outer member is to be cast, the bushing made of a thin metal is partially fused to and rigidly unified with the cast outer member.

In the present invention, the inner member having the convex-spherical surface may be a ball or an inner ring having the convex-spherical surface on its outer surface. Moreover, the inner member may be made of the material, which is used in the spherical joint of this kind in the prior art, such as bearing steel (i.e., high-carbon bearing steel).

On the other hand, the outer member for holding the inner member is made of a metal suited for the die-casting, such as aluminum or its alloy, zinc or its alloy. As to the melting point of this die-casting metal, moreover, a temperature of 570° to 750° C. is preferable for the aluminum metal, and a temperature of 420° to 450° C. is preferable for the zinc metal.

The thickness of the bushing to be sandwiched between the inner member and the outer member can be suitably designed. If the thickness is less than 0.3 mm, however, the forced contact between the bushing and the mold is so incomplete at the time of casting the outer member that the molten metal flows over the bushing and sticks to the inner member. If the thickness exceeds 0.8 mm, on the other hand, the bushing is difficult to come into close contact with the convex-spherical surface of the inner member by the pressing operation. Hence, the preferable thickness of the bushing is 0.4 to 0.6 mm.

The aforementioned bushing has to be fused to the outer member at the time of casting the outer member, and the material for the bushing can be exemplified by brass [YBsC1–YBsC4 having a melting point (in solid phase) of 915° C.], lead brass [having a melting point (in solid phase) of 885° C.], free-cutting brass [C3560R having a melting point (in solid phase) of 885° C.], forging brass [having a melting point (in solid phase) of 880° C.], aluminum brass [having a melting point (in solid phase) of 935° C.], phosphor bronze [PBC2 to PBC3 having a melting point (in solid phase) of 880° to 950° C.], or aluminum bronze [AlBC1 to AlBC2 having a melting point (in solid phase) of 1,037° to 1,062° C.]. The preferable material is a copper metal having a melting point of 800° to 900° C. In order to achieve the fusion to the outer member reliably and more rigidly, more preferably, the difference between the melting point of the metal of the bushing and that of the outer member is within a range of 100° to 400° C. Incidentally, the letters and numerals, designating the individual materials herein, are symbols according to Japanese Industrial Standards.

In case the lubrication between the bushing and the inner member is taken into consideration, on the other hand, the bushing is preferred to have an annular groove which is formed in the circumferential direction of its concave-spherical surface to act as a lubricating oil reservoir. With this annular groove, moreover, the fixture of the bushing to the outer member can be made stronger.

In the spherical joint of this kind, on the other hand, the inner member is the more liable to establish backlash with respect to the outer member under a condition of no load as the rocking or rotating motions of the inner member relative to the outer member are smoother. In order to prevent such backlash, therefore, the ball-retaining portion of the outer member may be formed with a mouth communicating with the convex-spherical surface of the inner member, and an elastic member may be mounted in that mouth for thrusting the inner member. With this construction, the backlash of the inner member relative to the outer member can be eliminated even in the state where no load is transmitted between the inner member and the outer member.

DETAILED DESCRIPTION OF THE PREFERRED EMBODIMENTS

The present invention will be specifically described in the following in connection with its embodiments with reference to the accompanying drawings.

Embodiment 1

Figure 1:
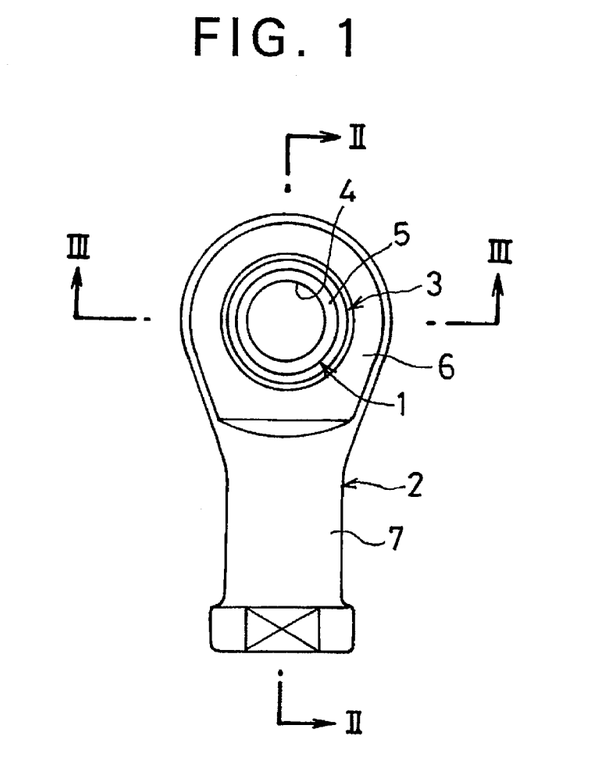
FIG. 1 is a front elevation showing a spherical joint according to Embodiment 1 of the present invention.
Figure 2:
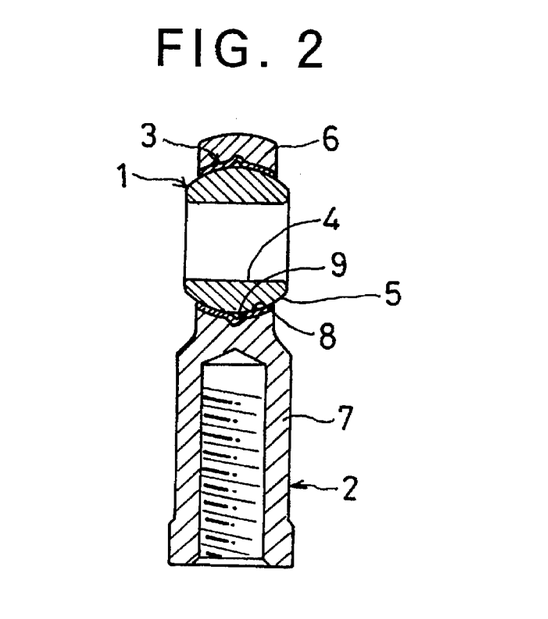
FIG. 2 is a section taken along line II—II of FIG. 1.
Figure 3:
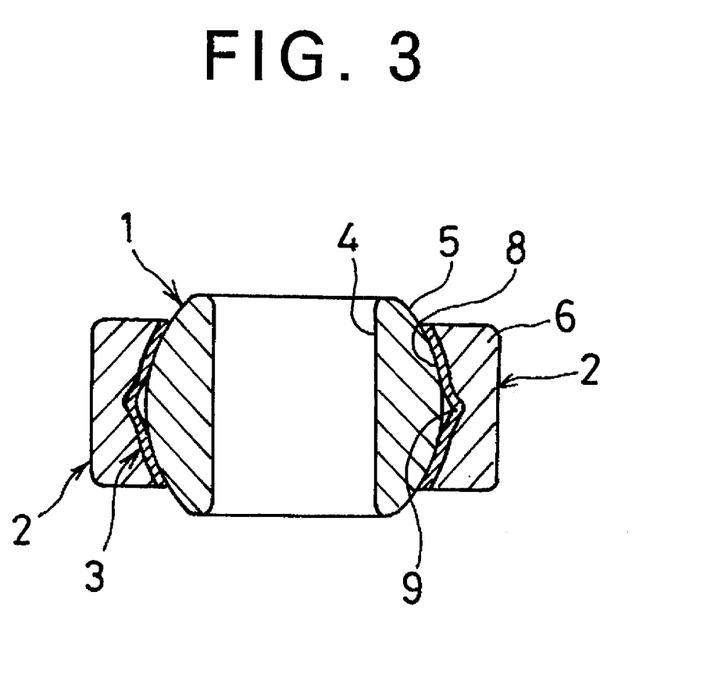
FIG. 3 is a section taken along line III—III of FIG. 1.

In FIGS. 1 to 3, there is shown a spherical joint according to Embodiment 1 of the present invention. This spherical joint is constructed to include an inner ring (or inner member) 1 having a convex-spherical surface 5 on its outer surface, a holder 2 (or outer member) formed at its one end with an inner ring retaining portion 6 for holding the inner ring 1 in a rotating or rocking manner and at its other end with a connecting portion 7 for connection with an external device, and a thin bushing 3 made of free-cutting brass and sandwiched between the inner ring 1 and the holder 2. The inner ring 1 is formed by boring a spherical member of high-carbon bearing steel with a through hole 4 for fixing a shaft, and the holder 2 is die-cast of an aluminum alloy (of Japanese Industrial Standards No. ADC12).

On the other hand, the bushing 3 is fused, when the holder 2 is die-cast, to the inner face of the inner ring retaining portion 6 of the holder 2. This bushing 3 is formed with a concave-spherical surface 8, which is made slidable relative to the convex-spherical surface 5 of the inner ring 1, and an annular groove 9 which extends circumferentially in the inner surface of the central portion of the bushing 3 for providing a reservoir for lubricating oil.

The spherical joint of this Embodiment 1 is manufactured, as follows.

Figure 4:
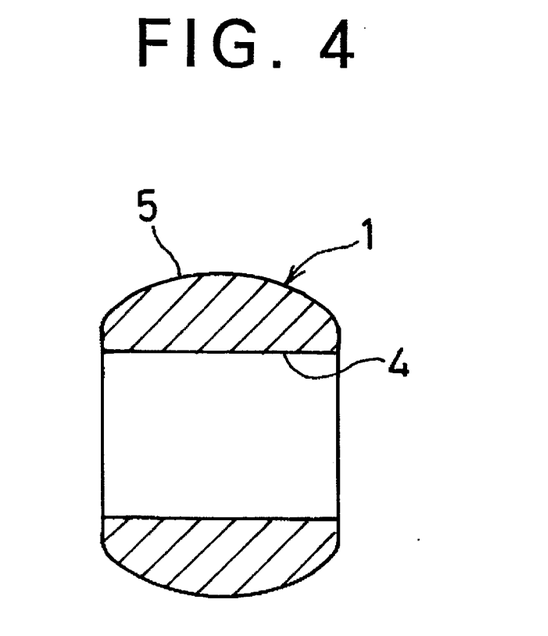
FIG. 4 is a section of the inner ring shown in FIG. 1.

First of all, the inner ring 1 is prepared by boring a spherical material of high-carbon bearing steel with the shaft-fixing through hole 4, as shown in FIG. 4. This inner ring 1 is hardened and then ground, and its convex-spherical surface 5 is lapped.

Figure 5:
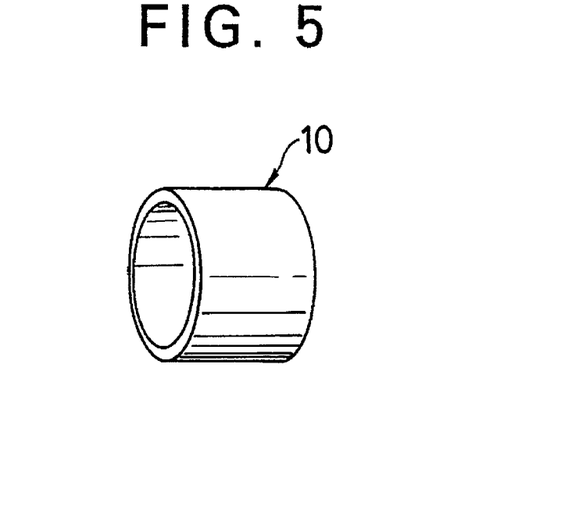
FIG. 5 is a perspective view of a cylindrical member of a metal for forming the bushing shown in FIG. 1.

Next, as shown in FIG. 5, a cylindrical member 10 is formed of free-cutting brass having a melting point of 885° C. to have an internal diameter substantially equal to the external diameter of the inner ring 1 and a thickness (t) of 0.5 mm. This cylindrical member 10 is pressed to form the aforementioned bushing 3.

Figure 6:
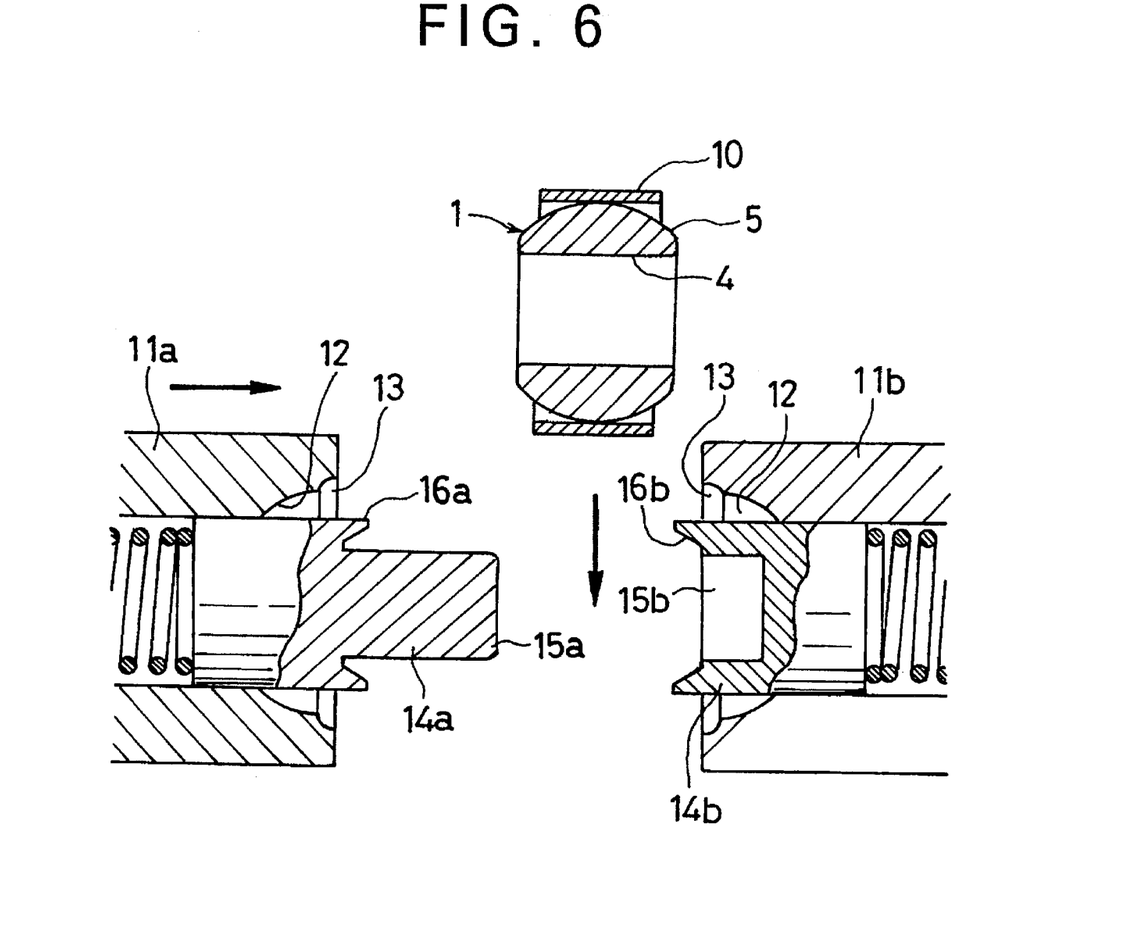
FIG. 6 is an explanatory section showing the state in which the inner ring is covered with the metallic cylindrical member and is set in a pair of press dies.

Next, as shown in FIG. 6, the cylindrical member 10 is fixed on the inner ring 1, coaxially with each other, and these two members are set and pressed between a pair of press dies 11a and 11b.

The paired press dies 11a and 11b are formed at their respective leading ends with die portions 12 so that the aforementioned cylindrical member 10 is caulked into close contact with the convex-spherical surface of the inner ring 1 when the press dies 11a and 11b are operated. Moreover, the press die 11a is arranged at its central portion with a male piston 14a biased by a spring, whereas the other press die 11b is also arranged at its central portion with a spring-biased female piston 14b. The male piston 14a has its center pin 14a extended through the through hole 4 of the inner ring 1, as set in the press die, so that the pin is fitted in the female piston 14b. This positions the inner ring 1 and the cylindrical member 10 in the press dies.

Moreover, the die portions 12 are formed with notched grooves 13 corresponding to the annular groove 9 of the aforementioned bushing 3. On the other hand, the male piston 14a and the female piston 14b are formed at their individual portions with thrust projections 16a and 16b for thrusting the two end portions of the cylindrical member 10 when the press dies 11a and 11b are fastened.

Figure 7:
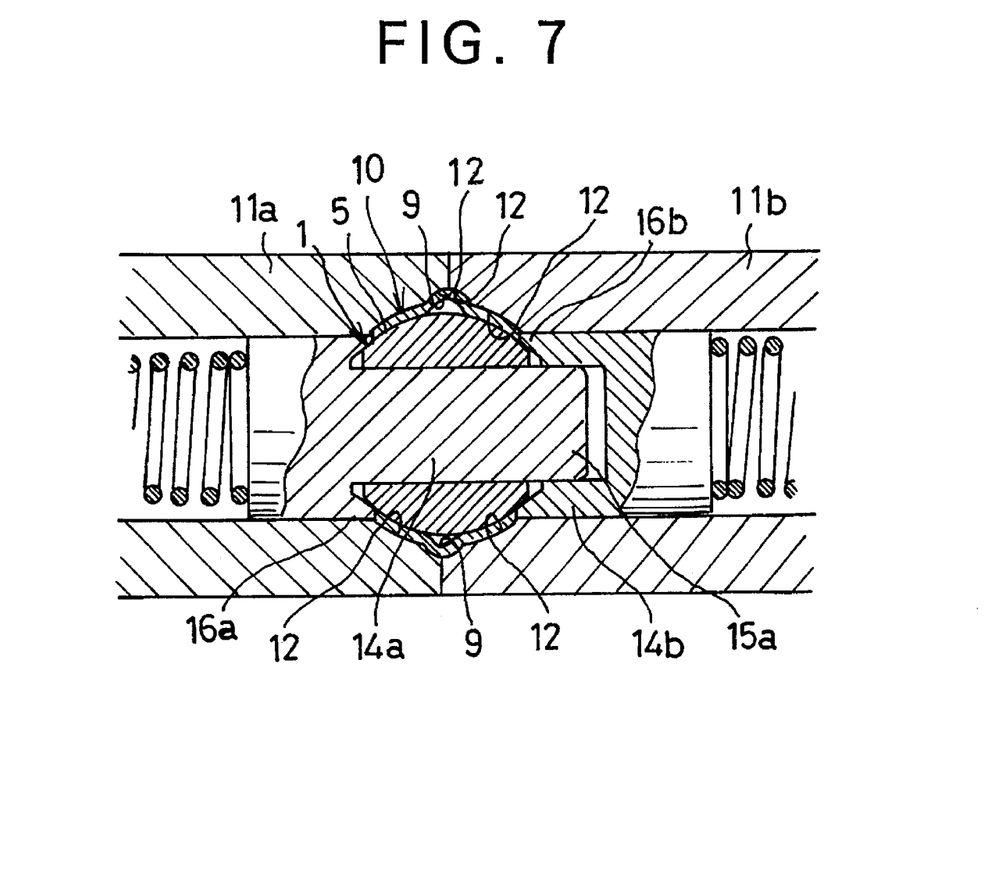
FIG. 7 is a section showing the state in which the paired press dies are fastened to cover the inner ring with the bushing.
Figure 8:
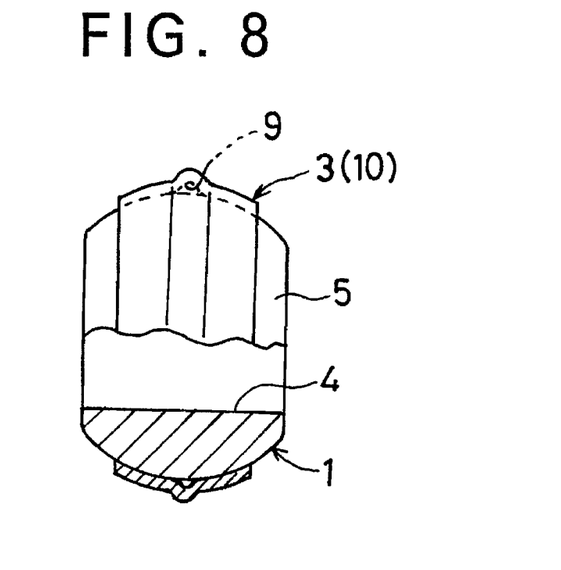
FIG. 8 is a partial section showing the state in which the inner ring has its convex-spherical surface covered with the bushing.

As shown in FIG. 7, moreover, the inner ring 1 and the cylindrical member 10 are set between the paired press dies 11a and 11b. As these press dies 11a and 11b are operated, the cylindrical member 10 is caulked at its two end portions by the die portions 12 so that it comes into close contact with the convex-cylindrical surface 5 of the inner ring 1. Simultaneously with this, the cylindrical member 10 is thrust from the two ends to the center by the thrust projections 16a and 16b of the male piston 14a and the female piston 14b so that its portion comes into the notched grooves 13 formed in the die portions 12. As a result, the cylindrical member 10 is shaped into the bushing 3 covering the convex-spherical surface 5 of the inner ring 1, and this bushing 3 is formed in its inner circumference with the annular groove 9 which extends in the circumferential direction of the bushing 3.

Figure 9:
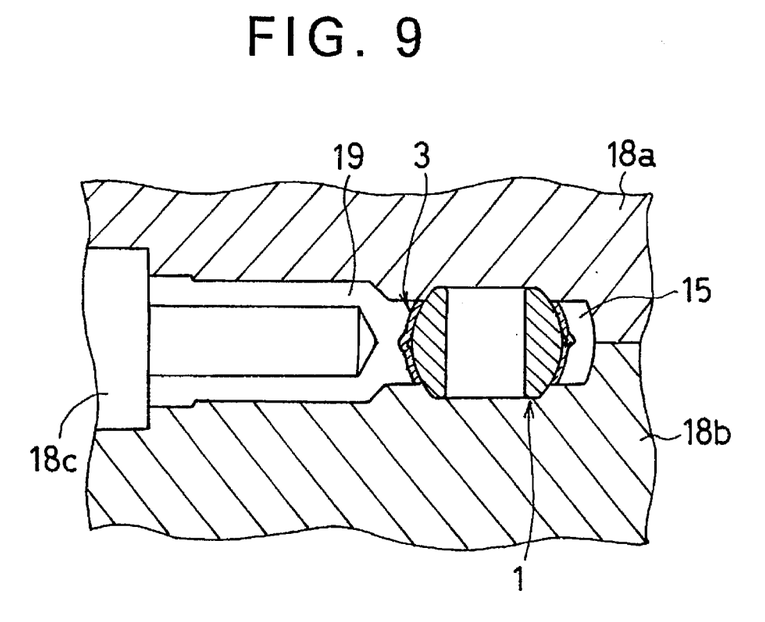
FIG. 9 is a section showing the state in which the inner ring covered with the bushing is set as a core in molds.

After the convex-spherical surface 5 of the inner ring 1 has thus been covered with the bushing 3, they are placed as a core in die-casting molds 18a, 18b and 18c, as shown in FIG. 9. A molten metal of an aluminum alloy (of Japanese Industrial Standards No. ADC12) having a melting point of 580° C. is injected into the cavity 19 which is defined by those die-casting molds 18a, 18b and 18c, to cast the holder 2, as shown in FIG. 2, around the aforementioned bushing 3.

At this time, the bushing 3 has its outer circumference melted by the heat of the molten metal so that it is fused to the cast holder 2. As a result, the bushing 3 is rigidly unified with the cast holder 2, so that no displacement is established between the holder 2 and the bushing 3 even if the inner ring 1 later rocks or rotates relative to the holder 2.

Figure 10:
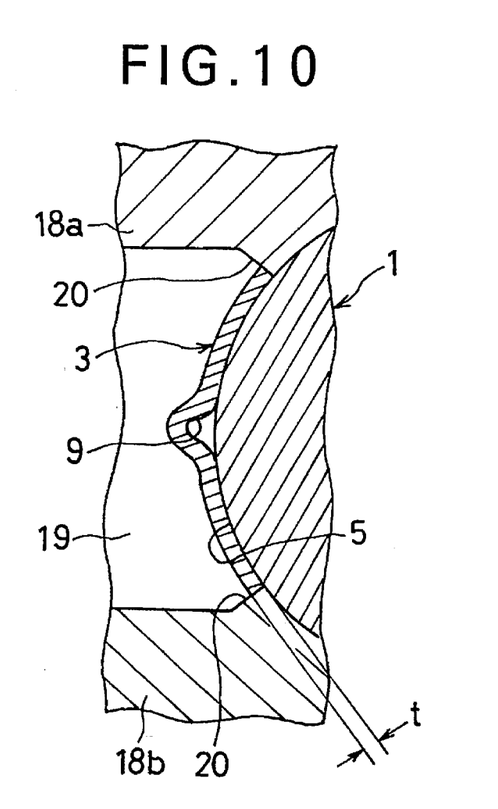
FIG. 10 is an enlarged section showing an essential portion of FIG. 9.

FIG. 10 is an enlarged section showing the contacting states between the bushing 3 and the die-casting molds 18a and 18b. In this die-casting process, as shown in FIG. 10, the bushing 3 is given thickness of t=0.5 mm so that its end portions never fail to abut against the gate-cutting portions 20 of the die-casing molds 18a and 18b. This prevents the molten metal injected into the cavity 19 from flowing over the bushing 8 and from being fused to the inner ring 1.

Moreover, the holder 2 thus die-cast is integrated with the inner ring 1 through the bushing 3. When the holder 2 is removed to cool from the die-casting molds 18a, 18b and 18c, it shrinks to fasten the bushing 3. As a result, the bushing 3 comes into closer contact with the convex-spherical surface of the inner ring 1 so that the concave-spherical surface 8 formed on the bushing 3 takes the contour which is transferred from the convex-spherical surface 5 of the inner ring 1. Thus, the concave-spherical surface 8 is a reflection of the sphericalness of the convex-spherical surface 5 of the inner ring 1.

After the holder 2 has been sufficiently cooled down, an external force is applied to the inner ring 1 or the holder 2 to establish a small clearance between the convex-spherical surface 5 of the inner ring 1 and the concave-spherical surface 8 of the bushing 3. This clearance ensures a smooth sliding contact between the inner ring 1 and the bushing 3 to provide the spherical joint in which the inner ring 1 can rotate or rock relative to the holder 2.

Embodiment 2

Figure 11:
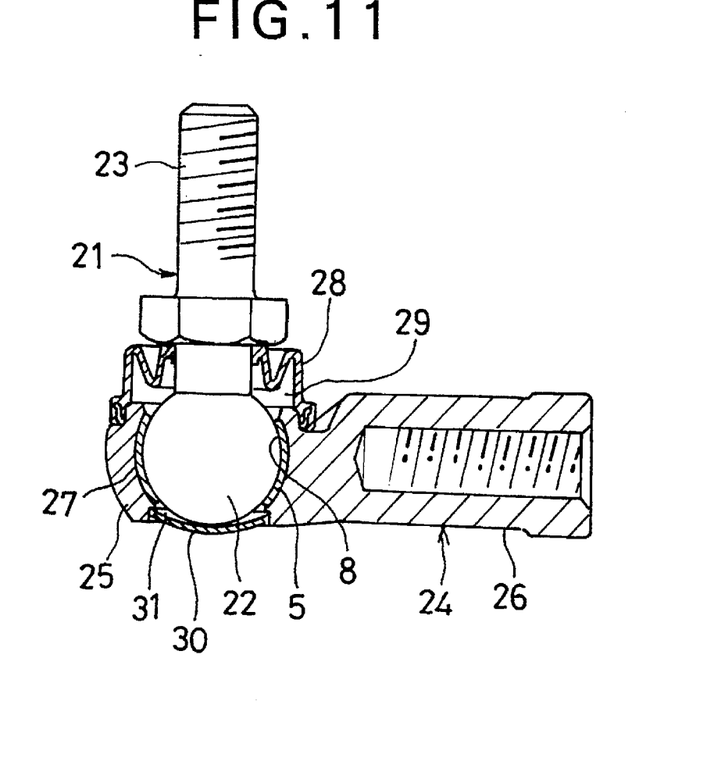
FIG. 11 is a section showing a spherical joint according to Embodiment 2 of the present invention.
Figure 12:
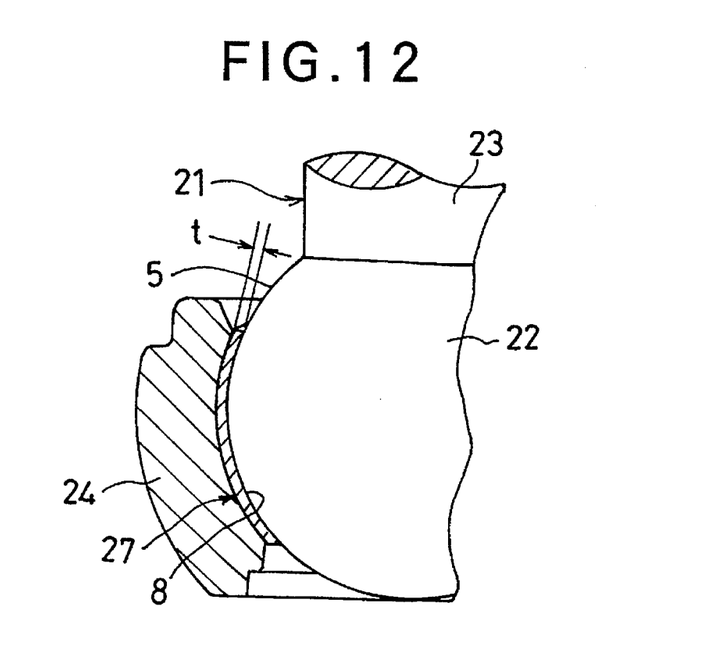
FIG. 12 is an enlarged section showing an essential portion of FIG. 11.

FIGS. 11 and 12 show a spherical joint according to Embodiment 2 of the present invention. This spherical joint is constructed, unlike the foregoing Embodiment 1, to include a ball rod (or inner member) 21 formed at its one end with a ball portion 22 and at its other end with a connecting portion 23, a holder (or outer member) 24 formed at its one end with a ball retaining portion 25 to be jointed to the ball portion 22 and at its other end with a connecting portion 26, and a bushing 27 sandwiched between the ball portion 22 of the ball rod 21 and the ball-retaining portion 25 of the holder 24. In this embodiment, the holder 2 and the bushing 3 are made of the same materials as those of the foregoing Embodiment 1.

In this spherical joint, moreover, a seal member 28 is sandwiched between the edge of the ball-retaining portion 25 of the holder 24 and the connecting portion 23 of the ball rod 21. An opening, as formed in the bottom of the ball-retaining portion 25 of the holder 24, is covered with a cover member 30. Lubricating oil pockets 29 and 31 are formed above and below the ball portion 22.

The process for manufacturing this spherical joint is absolutely identical to the aforementioned one of Embodiment 1. Specifically, the bushing 27 is pressed to cover the ball portion 22 of the ball rod 21. Then, the aforementioned holder 24 is die-cast by using the ball portion 22 as the core. After the holder 24, thus cast, has been cooled down, an external force is applied to the holder 24 or to the ball rod 21 to allow the ball rod 21 to freely rock or rotate relative to the holder 24.

According to this Embodiment 2, also, the bushing 27 is fused, as in the case of Embodiment 1, to the ball-retaining portion 25 of the holder 24 at the time of die-casting the holder 24. As a result, the holder 24 and the bushing 27 are rigidly unified so that the bushing 27 is not displaced from the holder even by the rotating or rocking motions of the ball rod 21. Moreover, the sphericalness of the ball portion 22 of the ball rod 21 is reflected without fail upon the concave-spherical surface of the bushing 27 so that the bushing 27 and the ball portion 22 come into smooth sliding contact to allow the ball rod 21 to move relative to the holder 24.

Embodiment 3

Figure 13:
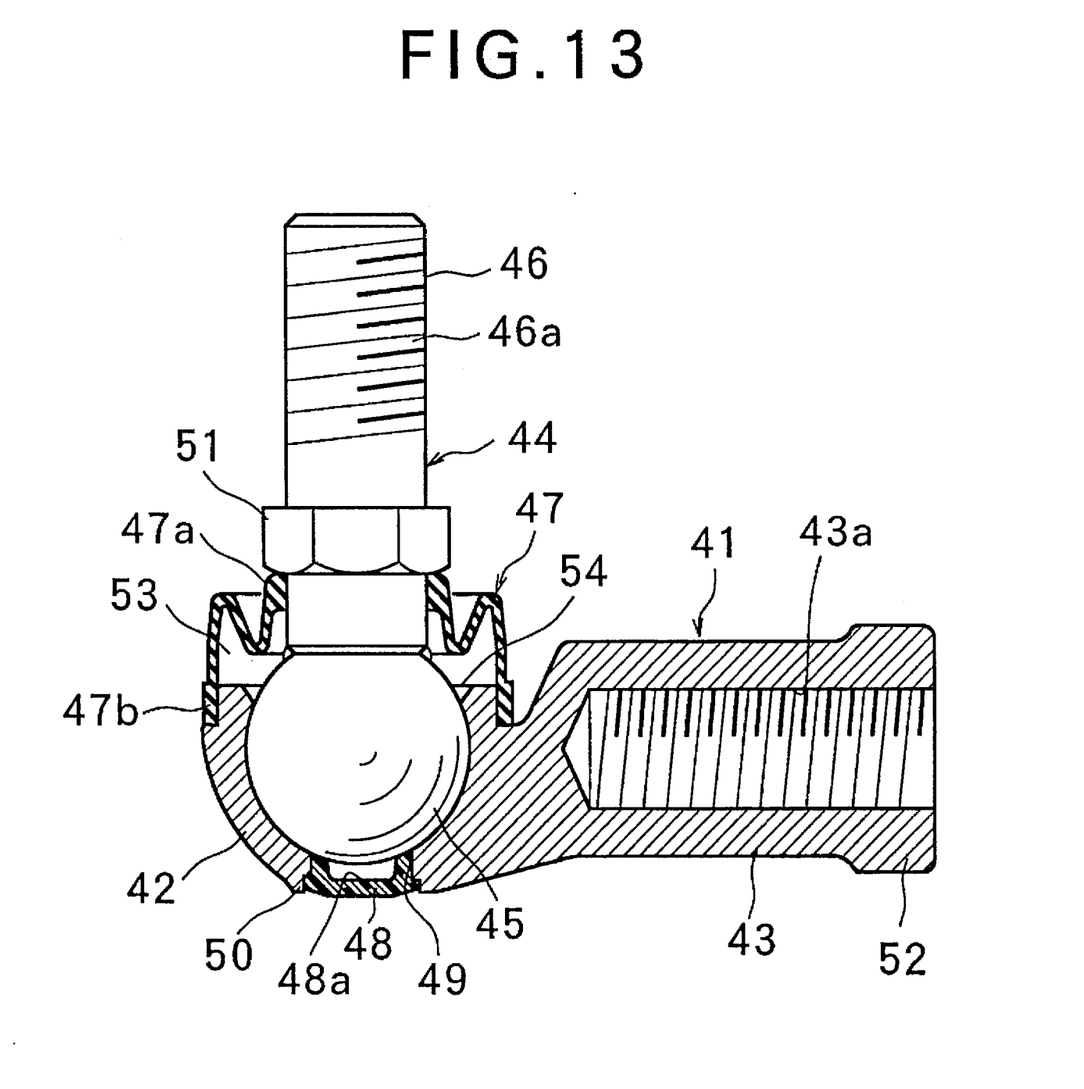
FIG. 13 is a section showing a spherical joint according to Embodiment 3 of the present invention.

FIG. 13 shows a spherical joint according to Embodiment 3 of the present invention. In FIG. 13, reference numeral 41 designates a holder which is formed with a ball-retaining portion 42 at its one end and a connecting portion 43 at its other end. This connecting portion 43 is internally threaded at 43a, and the ball-retaining portion 42 is formed in its top with a connecting mouth 54 and in its bottom with a cap-mounting mouth 49 which is opened in a direction perpendicular to the opening direction of the internal thread 43a. On the other hand, numeral 44 designates a ball rod which is formed at its one end with a ball portion 45 having a high sphericity and at its other end with a connecting portion 48. The ball portion 45 is retained in the ball-retaining portion 42 with such minimum necessary clearance as to rotate and rock. The connecting portion 48 is protruded from the ball-retaining portion 42 through the aforementioned connecting mouth 54, and this protruded portion is externally threaded at 46a. Moreover, the holder 41 and the ball rod 44 thus-constructed are connected generally in the shape of letter "L" to each other.

The ball rod 44 is formed at its root portion with a hexagonal tool engaging portion 51 which can engage with a spanner for turning the ball rod 44 when the connecting portion 48 is fastened at its externally threaded portion 46a to another moving portion (although not shown). Likewise, the holder 41 is formed at one end of its connecting portion 43 with a generally square tool-engaging portion 52 which can engage with a spanner.

Between the outer circumferential edge of the ball-retaining portion 42 and the root portion of the tool-engaging portion 51 of the ball rod 44, on the other hand, there is mounted a seal member 47 partly for forming a lubricant pocket 53 to contain a lubricant, such as grease, to be supplied to the clearance between the ball portion 45 and its retaining portion 42, and partly for preventing dust, or the like, from intruding into the gap around the connecting mouth 54. Here, the end portion 47a of the seal member 47, as located at the side of the ball rod 44, is held in close contact with the ball rod 44 by its elasticity, whereas the end portion 47b at the side of the ball-retaining portion 42 is retained on the outer circumferential edge of the ball-retaining portion 42 by a retaining ring so that it may not be removed from the ball-retaining portion 42 by the rocking or rotating motions of the ball rod 44.

Figure 14:
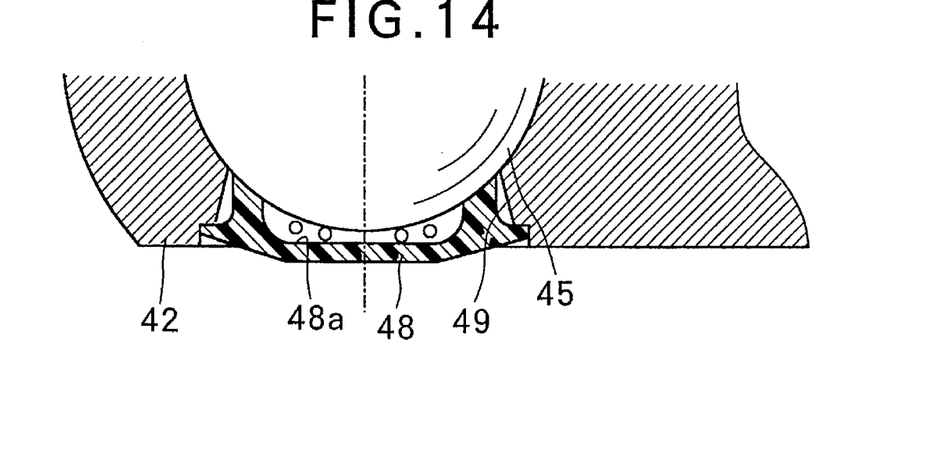
FIG. 14 is an enlarged section showing an essential portion of FIG. 13.

On the cap mounting mouth 49 of the ball-retaining portion 42, as shown in FIG. 14, there is mounted an elastic cap (or elastic member) 48 which is made of soft-type synthetic resin or rubber for thrusting the ball portion 45 of the ball rod 44. The thrust surface of the elastic cap 48 for thrusting the ball portion 45 is formed therein with a recess 48a which functions as a lubricating oil pocket when the elastic cap 48 is fitted in the cap mounting mouth 49. Moreover, this elastic cap 48 is fixed in the ball retaining portion 42 by caulking the ridge 50 which is formed on the circumferential edge of the cap-mounting mouth 49. In the present embodiment, the elastic cap 48 is made of soft nylon, for example.

In the spherical joint, thus-constructed according to the present embodiment, the elastic cap 48 is held in abutment against the ball portion 45 by such a thrust as to establish a slight elastic deformation in the soft type synthetic resin. This thrust is directed to eliminate the clearance between the ball portion 45 and the ball-retaining portion 42 so that the ball portion 45 may be clamped between the elastic cap 48 and the ball-retaining portion 42. Specifically, the thrust of the elastic cap 48 acts in the direction toward the connecting mouth 54 of the ball-retaining portion 42 so that reactions f' against the thrust f of the elastic cap 48 (see FIG. 15) act upon the ball portion 45 along the edge portion of the connecting mouth 54.

Figure 15:
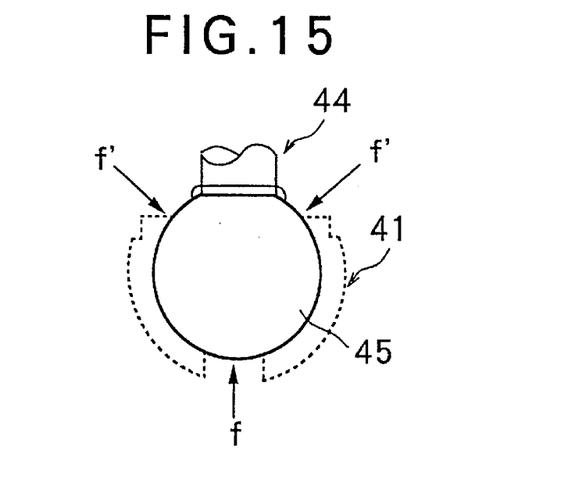
FIG. 15 is an explanatory diagram showing a thrust f to act upon the ball portion and its reactions f'.

As a result, the ball portion 45 is clamped between the elastic cap 48 and the edge of the connecting mouth 54 so that the rotation of the ball portion 45 relative to the ball-retaining portion 42 can be prevented without fail by the clamping frictional force. Thus, the backlash between the ball rod 44 and the holder 41 can be eliminated, even in case vibrations are applied to the spherical joint while no load is transmitted (i.e., in an unloaded state) between the ball rod 44 and the holder 41.

Due to the construction in which the ball portion 45 is retained between the elastic cap 48 and the ball-retaining portion 42, moreover, the ball rod 44 is prevented from rocking relative to the holder 41. As a result, even in case an impact load or an abrupt acceleration is applied to the spherical joint in the unloaded state, the holder 41 can be prevented from falling around the ball portion 45 relative to the ball rod 44 so that the ball-retaining portion 42 can have its edge prevented from impinging upon the ball rod 44.

On the other hand, even in case the ball portion 45 of the ball rod 44 is retained in the ball-retaining portion 42 of the holder 41 by the thrust of the elastic cap 48, the elastic cap 48 is thrust and deformed by the ball portion 45 if a load acts upon the holder 41 or the ball rod 44. As a result, the spherical surface of the ball portion 45 comes into contact with the peripheral surface of the ball-retaining portion 42 so that the aforementioned load can be borne without fail. Thus, under the loaded condition, the smooth rocking and rotating motions can be ensured between the holder 41 and the ball rod 44.

Figure 16:
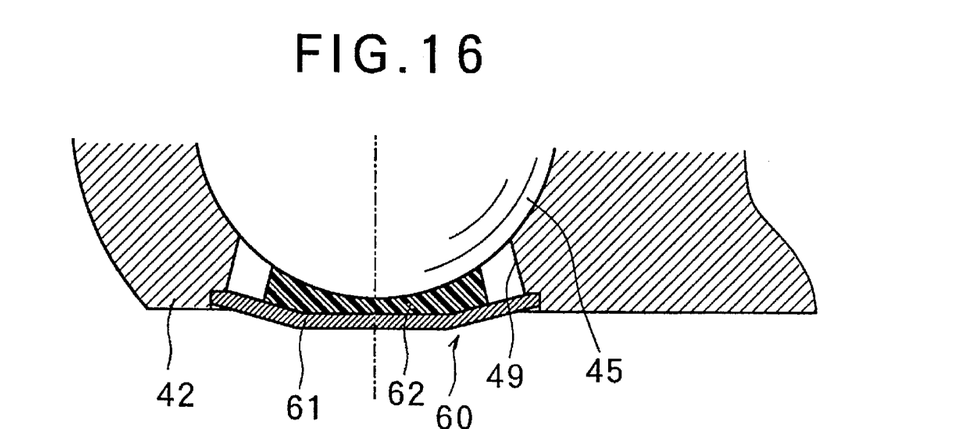
FIG. 16 is an enlarged section showing another example of an elastic cap.

FIG. 16 shows another example of the aforementioned elastic cap.

This elastic cap, as designated at 60, is prepared by adhering a soft type synthetic resin or rubber 62 to one side of a metallic plate 61. Like the elastic cap 48 of the foregoing Embodiment 3, the elastic cap 60 is fixed on the ball-retaining portion 42 by inserting the plate 61 in the cap-mounting mouth 49 of the ball-retaining portion 42 and then by caulking the ridge 50 which is formed on the circumferential edge of the cap-mounting mouth 49.

In the case of using this elastic cap 60, too, the backlash between the ball rod 44 and the holder 41 under an unloaded condition can be prevented. In this elastic cap 60, moreover, the ball portion 45 can be thrust by the elasticity of the metallic plate 61 fixed in the cap mounting mouth 49. This raises an advantage that the backlash between the ball rod 44 and the holder 41 can be more reliably prevented than the elastic cap 48 made of a soft type synthetic resin.

Embodiment 4

Figure 17:
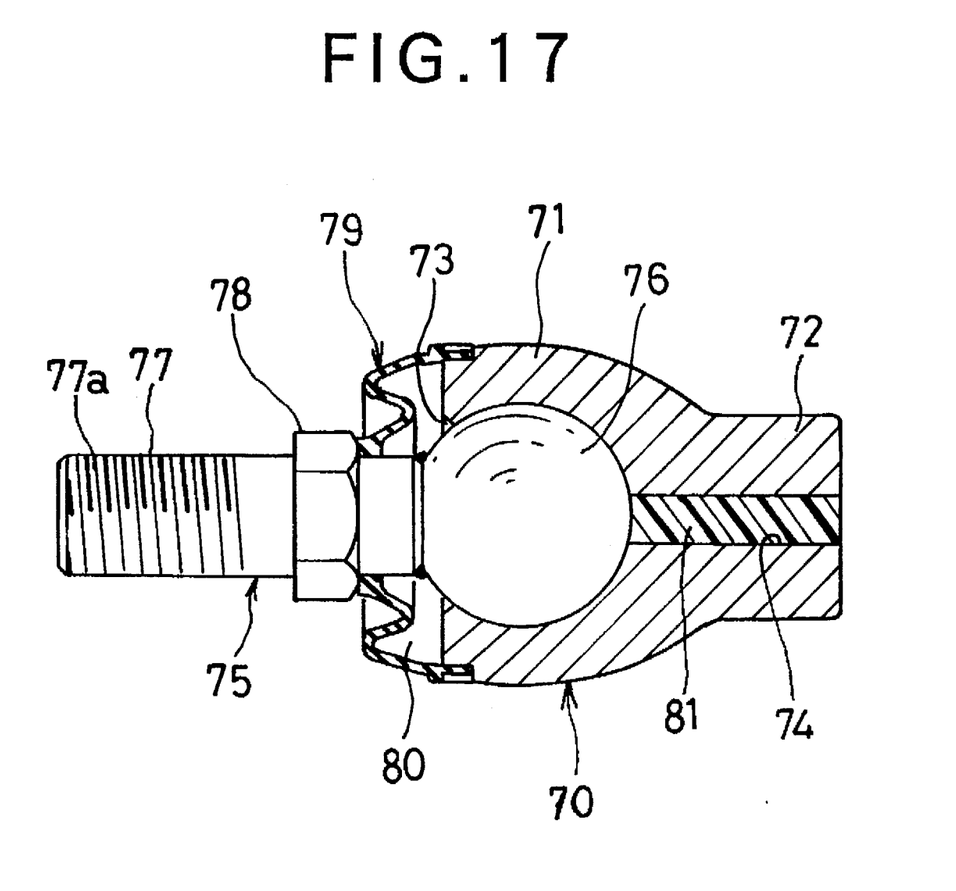
FIG. 17 is a section showing a spherical joint according to Embodiment 4 of the present invention.

FIG. 17 shows a spherical joint according to Embodiment 4 of the present invention.

In FIG. 17, reference numeral 70 designates a holder which is formed with a ball-retaining portion 71 at its one end and a connecting portion 72 at its other end. This connecting portion 72 has its outer circumference externally threaded (although not shown), and the ball-retaining portion 71 has its leading end portion opened to form a connecting mouth 73. On the other hand, the connecting portion 72 is formed therethrough with a stick inserting hole 74 which has its one end opened into the aforementioned ball-retaining portion 71.

On the other hand, numeral 75 designates a ball rod which is formed at its one end with a ball portion 76 having a high sphericalness and at its other end with a connecting portion 77. The ball portion 76 is retained in the ball-retaining portion 71 with such minimum necessary clearance as to rotate and rock. The connecting portion 77 is protruded from the ball-retaining portion 71 through the aforementioned connecting mouth 73, and this protrusion is externally threaded at 77a. Moreover, the holder 70 and the ball rod 75, thus-constructed are connected generally in a straight line.

As in the foregoing Embodiment 1, moreover, the ball rod 75 is formed at its root portion with a hexagonal tool engaging portion 78. Between the outer circumferential edge of the ball-retaining portion 71 and the root portion of the tool engaging portion 78 of the ball rod 75, on the other hand, there is mounted a seal member 79 for forming a lubricant pocket 80.

Into the stick inserting hole 74 of the holder 70, moreover, there is press-fitted an elastic stick (or elastic member) 81 for thrusting the ball portion 76 of the ball rod 75. This elastic stick 81 is fixed in the stick inserting hole 74 by forcing it into the stick-inserting hole 74 and then by caulking the circumferential edge of the stick-inserting hole 74 at the end face of the connecting portion 72. Before the elastic stick 81 is press-fitted, the stick-inserting hole 74 may be filled with lubricating oil to lubricate the fine clearance between the ball-retaining portion 71 and the ball portion 76.

In the spherical joint thus-constructed according to the present embodiment, also, the ball portion 76 is retained as in the foregoing Embodiment 3 between the elastic stick 81 and the edge portion of the connecting mouth 73. As a result, under the so-called "unloaded condition" having no load transmission between the ball rod 75 and the holder 70, the backlash between the ball rod 75 and the holder 70 can be prevented, and the holder 70 can be prevented from falling relative to the ball rod 75. Under the loaded condition, on the other hand, the elastic stick 81 is thrust and deformed by the ball portion 76. As a result, the spherical surface of the ball portion 76 comes into the spherical surface of the ball retaining portion 71 so that smooth rocking and rotating motions can be retained between the holder 70 and the ball rod 75.

Incidentally, in the present embodiment, the elastic stick 81 is press-fitted in the stick inserting hole 74 which is formed in the holder 70. Alternatively, this hole 74 may be filled with an injected molten synthetic resin.

What is claimed is:

1. A spherical joint, comprising:

a ball rod having a ball portion at its one end and a threaded portion at its other end;

a holder having a ball-retaining portion for retaining said ball portion at its one end for relative rocking and rotational movement therebetween and a threaded portion at its other end;

an opening defining a mouth formed in said holder and extending through a wall thereof to communicate with said ball-retaining portion, and an inside diameter of said mouth is smaller than an outside diameter of said ball portion;

an elastic member fitted in said mouth and being operative for thrusting said ball portion when a load is not transmitted between said ball rod and said holder, said elastic member being deformable by said ball portion when a load is transmitted between said ball rod and said holder; and means for securing said elastic member to said holder.

2. A spherical joint according to claim 1, wherein said ball-retaining portion of said holder and said threaded portion thereof are connected generally in the shape of letter "L", and wherein said elastic member is formed into a cap covering said mouth.

3. A spherical joint, comprising:

a ball rod having a ball portion at its one end and a threaded portion at its other end;

a holder having a ball-retaining portion for retaining said ball portion at its one end and a threaded portion at its other end, and said holder being connected with said ball rod generally in the shape of letter "L";

an opening defining a mouth formed in said holder and extending through a wall thereof to communicate with said ball-retaining portion;

an elastic cap fitted in said mouth and being operative for thrusting said ball portion when a load is not transmitted between said ball rod and said holder, said cap being deformable by said ball portion when a load is transmitted between said ball rod and said holder;

means for securing said elastic cap to said holder; and wherein said elastic cap has a plate portion for attachment to said holder and an elastic portion provided on one side of said plate portion for thrusting said ball rod, and an inside diameter of said mouth is larger than an outside diameter of said elastic portion for forming an annular gap between said mouth and elastic portion.

4. A spherical joint, comprising:

a ball rod having a ball portion at its one end and a threaded portion at its other end;

a holder connected generally in a straight line with respect to said ball rod and having a ball-retaining portion for retaining said ball portion for relative rocking and rotational movement therebetween, an opening defining a mouth formed in said holder and extending through a wall thereof to communicate with said ball-retaining portion, an inside diameter of said mouth being smaller than an outside diameter of said ball portion;

an elastic member formed into a stick shape fitted in said mouth and being operative for thrusting said ball portion when a load is not transmitted between said ball rod and said holder, said elastic member being deformable by said ball portion when a load is transmitted between said ball rod and said holder; and means for securing said elastic member to said holder.

* * * * *